(12) United States Patent
Weber

(10) Patent No.: US 10,919,355 B2
(45) Date of Patent: Feb. 16, 2021

(54) CHASSIS SYSTEM

(71) Applicant: SAF-HOLLAND GmbH, Bessenbach (DE)

(72) Inventor: Elmar Weber, Dülmen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 83 days.

(21) Appl. No.: 16/317,405

(22) PCT Filed: Jun. 21, 2017

(86) PCT No.: PCT/EP2017/065257
§ 371 (c)(1),
(2) Date: Jan. 11, 2019

(87) PCT Pub. No.: WO2018/010925
PCT Pub. Date: Jan. 18, 2018

(65) Prior Publication Data
US 2019/0291527 A1    Sep. 26, 2019

(30) Foreign Application Priority Data
Jul. 14, 2016 (DE) ..................... 10 2016 113 011.7

(51) Int. Cl.
*B60G 11/26* (2006.01)
*B60G 7/00* (2006.01)
(Continued)

(52) U.S. Cl.
CPC .............. *B60G 11/26* (2013.01); *B60G 7/001* (2013.01); *B60G 9/003* (2013.01); *B60G 11/28* (2013.01); *F16F 9/54* (2013.01); *B60G 2200/31* (2013.01); *B60G 2202/152* (2013.01); *B60G 2204/126* (2013.01); *B60G 2204/4232* (2013.01); *B60G 2204/61* (2013.01); *B60G 2206/011* (2013.01); *B60G 2206/424* (2013.01); *B60G 2300/026* (2013.01); *F16F 9/057* (2013.01);
(Continued)

(58) Field of Classification Search
CPC ........ B60G 11/26; B60G 7/001; B60G 9/003; B60G 11/28; B60G 2200/31
See application file for complete search history.

(56) References Cited

U.S. PATENT DOCUMENTS 5,954,351 A  *  9/1999  Koschinat .............. B60G 9/003
                                                      280/124.116

FOREIGN PATENT DOCUMENTS

DE        4213676       10/1993
DE       29616257       11/1996
(Continued)

OTHER PUBLICATIONS

European Patent Office; International Search Report; dated Sep. 8, 2017.

*Primary Examiner* — Faye M Fleming
(74) *Attorney, Agent, or Firm* — Price Heneveld LLP

(57) ABSTRACT

A chassis system for commercial vehicles includes a trailing arm and a plunger piston which are connected or can be connected to one another via a connecting region, the connecting region having an adjusting device which includes an engagement element and a guide element, and it being possible for the engagement element to be moved relative to the guide element in such a way that a displacement, in particular a translational movement, of the plunger piston relative to the trailing arm is made possible.

11 Claims, 1 Drawing Sheet

(51) Int. Cl.
*B60G 9/00* (2006.01)
*B60G 11/28* (2006.01)
*F16F 9/54* (2006.01)
*F16F 9/05* (2006.01)

(52) U.S. Cl.
CPC ... *F16F 2230/0005* (2013.01); *F16F 2230/32* (2013.01); *F16F 2230/36* (2013.01); *F16F 2230/38* (2013.01)

(56) References Cited

FOREIGN PATENT DOCUMENTS

| | | |
|---|---|---|
| DE | 102012201745 | 8/2013 |
| DE | 102014012530 | 3/2016 |

\* cited by examiner

CHASSIS SYSTEM

BACKGROUND OF THE INVENTION

The present invention relates to a chassis system, in particular for commercial vehicles, to a plunger piston and to a trailing arm.

Chassis systems of the type in question comprise, for example, a trailing arm which is mounted rotatably in a hanger bracket and is suspended and/or damped, for example, via an air spring bellows, together with a corresponding damper element. Here, the air spring bellows comprises a plunger piston which is fastened to or in the region of an arm end of the trailing arm. The location or position of said arrangement/fastening is predefined fixedly in the case of the systems which are known from the prior art, for example via a corresponding drilling pattern in the arm end. This can lead to problems, however, if the chassis system is to be used in different vehicle types which provide, for example, a different amount of installation space or have different axle kinematics. The consequence is that a great variety of variants have to be kept in stock and/or the air spring bellows arrangement always has to be adapted individually relative to the trailing arm which is currently being used.

It is therefore an object of the present invention to specify a chassis system, a plunger piston and a trailing arm which eliminate the abovementioned disadvantages and at the same time make an inexpensive and flexible system construction possible.

SUMMARY OF THE INVENTION

According to the invention, a chassis system, in particular for commercial vehicles, comprises a trailing arm and a plunger piston which are connected or can be connected to one another via a connecting region and can be arranged on one another or are arranged on one another, the connecting region having an adjusting device which comprises an engagement element and a guide element, and it being possible for the engagement element to be moved or displaced in or relative to the guide element in such a way that a movement or displacement, in particular a translational movement or displacement, of the plunger piston relative to the trailing arm is made possible. In accordance with one preferred embodiment, the trailing arm is mounted rotatably in or on a hanger bracket. The hanger bracket is in turn fastened, for example, to a vehicle frame of a (commercial vehicle) traction engine or a (commercial vehicle) trailer. An axle tube which extends along an axle tube longitudinal direction which is in turn oriented substantially transversely with respect to a driving direction of the vehicle is arranged or can be arranged in or on the trailing arm. The damping action preferably takes place via a damper element which is expediently fixed or can be fixed on the hanger bracket and the trailing arm. Behind the axle tube as viewed in the driving direction, the trailing arm forms an arm end or has said arm end, the air spring bellows preferably being arranged in or on the arm end. In particular, the plunger piston of the air spring bellows is fastened to/arranged on the arm end, the connecting region, comprising the adjusting device, advantageously then being provided, via which the displacement, in particular a translational displacement, of the plunger piston and/or the air spring bellows relative to the trailing arm/arm end is made possible. In particular, a movability or displaceability in a substantially horizontal plane is made possible, the location and orientation of said horizontal plane being predefined by way of the configuration of the trailing arm, in particular the arm end. In accordance with one embodiment, the arm end has, for example, a type of flat area, on which the plunger piston is arranged. Space problems can be reacted to as a result of the movability and the resulting degrees of freedom, for example if a collision with another component of the chassis would occur in the case of the arrangement of a defined air spring bellows. The introduction of force and the overall axle kinematics can also advantageously be adapted by way of the movability. In addition, different bellows overhangs and bellows offsets (and therefore also wheelbases and track widths) can be realized simply and effectively solely by way of the orientation of the air spring bellows and/or the plunger piston relative to the trailing arm. This is made possible by way of the interaction of the engagement element and the guide element, the guide element being designed to guide the engagement element along an adjustment path in a positively locking manner, said adjustment path extending, for example, along the axle tube longitudinal direction or in general along a longitudinal direction of the guide element. It is not fixed here that the guide element is allocated to the arm end and the engagement element is allocated to the plunger piston. A reversed configuration is also possible.

In one preferred embodiment, the plunger piston is supported directly on a region of the trailing arm. The effects of settling of the components are reduced by way of the reduction of the joins. It is advantageous, in particular, if that part of the trailing arm which extends between the axle tube and the plunger piston is configured in one piece. This achieves a situation where the trailing arm is designed even for high loads.

The connecting region is advantageously configured as an adapter plate which is arranged between the trailing arm and the air spring bellows. This achieves a compact overall design which can also be designed as a retrofit kit for chassis systems which already exist. The adapter plate is preferably arranged directly on the trailing arm and/or on the spring bellows. This achieves a particularly compact overall design. The contact-making surfaces of the adapter plate which are designed to come into contact with other components of the chassis system are advantageously configured parallel to one another. As a result, in particular, a flexural stress of the adapter plate is avoided, with the result that said adapter plate has to have only a small material thickness, with the result that weight can be saved.

In accordance with one embodiment, the adjusting device is designed to make a translational movement or displacement substantially parallel to the axle tube longitudinal direction possible, for example by a certain offset (along the adjustment path). An offset of this type, in relation to a center axis of the air spring bellows and a center line of the trailing arm and/or the arm end, lies in a range of up to 70 mm, for example at approximately 20, 30, 40, 50 or 60 mm, in preferred embodiments. The engagement element can then expediently be fixed or locked in the desired position, it being possible for the locking action to preferably take place via a positively locking and/or non-positive connection, for example via a screw connection and/or plug-in connection which fixes the engagement element relative to the guide element. In particular, an offset in the direction of the chassis center in relation to the center line of the trailing arm is preferred. As an alternative or in addition, however, the offset can also be toward the outside or else oblique with respect to the axle tube longitudinal direction or transverse with respect to the latter.

Infinitely variable setting of the offset is advantageously also made possible by virtue of the fact that the engagement element can be displaced in the guide element in an infinitely variable manner.

In accordance with one preferred embodiment, the guide element has a guide channel, in particular a groove profile. Here, the guide element and the guide channel extend substantially along a straight line, said straight line being oriented substantially parallel to the axle tube longitudinal direction in one preferred embodiment and therefore substantially transversely with respect to the driving direction. It is also possible to provide a plurality of guide channels of this type substantially parallel to one another. As an alternative, the guide element and the guide channel or the groove profile can also have a curvature or a bend at least in regions, however, as a result of which a two-dimensional adjustment is made possible as it were. Here, a guide channel has, in particular, a wall, a bottom and an elongate opening. The channel advantageously comprises two walls, however. This achieves a situation where, inter alia, a possible engagement element can be supported on both walls of the guide channel in a bidirectional manner. The cross section of the guide channel can expediently be configured in such a way that it has an undercut. This achieves a situation where, in particular, a possible engagement element cannot be pulled out of the guide channel owing to a positively locking connection with the undercut of said guide channel. In accordance with one preferred embodiment, a depth of a guide channel or groove profile of this type is at least approximately 20 mm, in particular at least approximately 30 mm, and a width is at least 20 mm, in particular at least 34 mm. A cross section of the guide channel or groove profile can have a substantially angular, for example square or rectangular, shape. As an alternative, a type of dovetail guide can also be provided, which also makes a positively locking connection possible as viewed along the center axis. Round, for example oval or circular, contours are also possible. A configuration in the manner of a T-shaped groove is also preferred. It is decisive that a positively locking connection is produced by way of the engagement element, which positively locking connection makes a positively locking action possible, in particular transversely with respect to a longitudinal extent of the guide element, and which makes the displacement along a longitudinal extent of the guide element possible. In addition or as an alternative, at least one guide element or at least one guide channel can also extend substantially along the driving direction or else at an angle obliquely with respect to the latter. A plurality of guide channels also do not have to be arranged in parallel, but rather can possibly also intersect one another, for example approximately at a 90° angle. A very variable adjusting device can be realized in this way.

In accordance with one embodiment, the guide element, in particular the guide channel or the groove profile, is closed at one end. In accordance with one embodiment, for example, the closed end is that end of which is oriented toward a vehicle outer side. In this way, for example, an option to distinguish between a left-hand and a right-hand trailing arm can be produced, as a result of which the assembly can be simplified considerably. The guide element, in particular the guide channel, is expediently configured at at least one end in such a way that the engagement element can be introduced, in particular can be pushed in. For this purpose, the guide channel is correspondingly accessible, for example, from the side or from above.

In accordance with one embodiment, one or more spacer pieces are arranged or can be arranged in and/or on the guide element, in order to make setting of the position of the engagement element relative to the trailing arm or to the guide element possible. The length of the abovementioned offset can be set rapidly and simply via the length of the spacer pieces which are used. A spacer piece can advantageously bear, for example, against the abovementioned closed end, the closed end advantageously acting as a stop. Spacer pieces of this type can be arranged in the guide channel on the left and on the right of the engagement element, with the result that the engagement element can be fixed in a defined position relative to the guide channel or to the trailing arm via fastening of a corresponding spacer piece. The spacer piece or pieces which for its/their part can be displaced in the guide element/guide channel or can be pushed into the latter can therefore be fixed in the guide element/guide channel, as a result of which the plunger piston is expediently also fixed. A desired plunger piston offset or bellows offset can be set rapidly by way of spacer pieces of different length which can be pushed into the groove profile which is, for example, T-shaped.

In accordance with one embodiment, the guide element is spaced apart from an axle tube center point at a spacing of approximately from 340 to 380 mm, said spacing being measured along or parallel to the driving direction. In preferred embodiments, the spacing lies at approximately from 360 to 364 mm, for example at approximately from 362 to 363 mm, in particular 362.5 mm. It has been shown that a multiplicity of different vehicle types can be served by way of said dimension. If the engagement element is configured at the arm end, the abovementioned dimension relates to its spacing from the axle tube center point.

In accordance with one preferred embodiment, the engagement element is offset relative to a center axis of the plunger piston by a spacing. In this respect, a further degree of freedom results, namely by way of the different arrangement of the plunger piston on the arm end. In preferred embodiments, the spacing is approximately from 18 to 26 mm, preferably approximately from 20 to 24 mm, in particular approximately 22.5 mm. Said "spacing" has proven advantageous, in order for it to be possible to serve as many vehicle types as possible in the case of a "rotated" installation of the air spring bellows/plunger piston. If the plunger piston comprises the guide element, the spacing denotes the distance between the center axis of the plunger piston and the guide element.

In accordance with one preferred embodiment, the air spring bellows or the plunger piston is arranged in such a way that its center axis is arranged behind the guide element or the engagement element as viewed in the driving direction, by the predefined spacing in a range of approximately from 18 to 26 mm. The air spring bellows or the plunger piston can also be arranged rotated by 180°, however, with the result that its center axis is arranged in front of the engagement element or the guide element as viewed in the driving direction. In one case, the center axis of the air spring bellows is therefore oriented more closely toward an axle tube center point than the adjusting device. In the other case, it is oriented further away.

In accordance with one embodiment, the adjusting device also comprises a plurality of guide elements or guide channels, as a result of which the degrees of freedom of the air spring bellows with respect to the arm end or with respect to the trailing arm can be increased further.

In accordance with one embodiment, the engagement element is configured in such a way that a rotatability of the plunger piston relative to the trailing arm is made possible. This can take place, for example, by way of a substantially rotationally symmetrical, in particular spherical, engagement element which is arranged in a positively locking manner in a correspondingly configured guide element. In an embodiment of this type, the position of the engagement element represents a type of rotational axis as it were. Said embodiment preferably makes a pivoting movement of the air spring bellows relative to the trailing arm possible.

In accordance with one preferred embodiment, the engagement element is mounted rotatably in and/or on the plunger piston, in particular via an insert which is arranged rotatably in the plunger piston and which has or configures the engagement element. In other words, the engagement element is therefore configured in such a way that a rotatability of the plunger piston relative to its center axis is made possible.

The invention also relates to a plunger piston, comprising an engagement element or a guide element.

Furthermore, the invention relates to a trailing arm, comprising an engagement element or a guide element. The advantages and features which were described in conjunction with the chassis system apply in an analogous and corresponding manner to the plunger piston according to the invention and to the trailing arm according to the invention, and vice versa.

BRIEF DESCRIPTION OF THE DRAWINGS

Further advantages and features result from the following description of one preferred embodiment of a chassis system having a plunger piston and a trailing arm, with reference to the appended figures, in which.

DETAILED DESCRIPTION OF THE PREFERRED EMBODIMENTS

Figure 1:
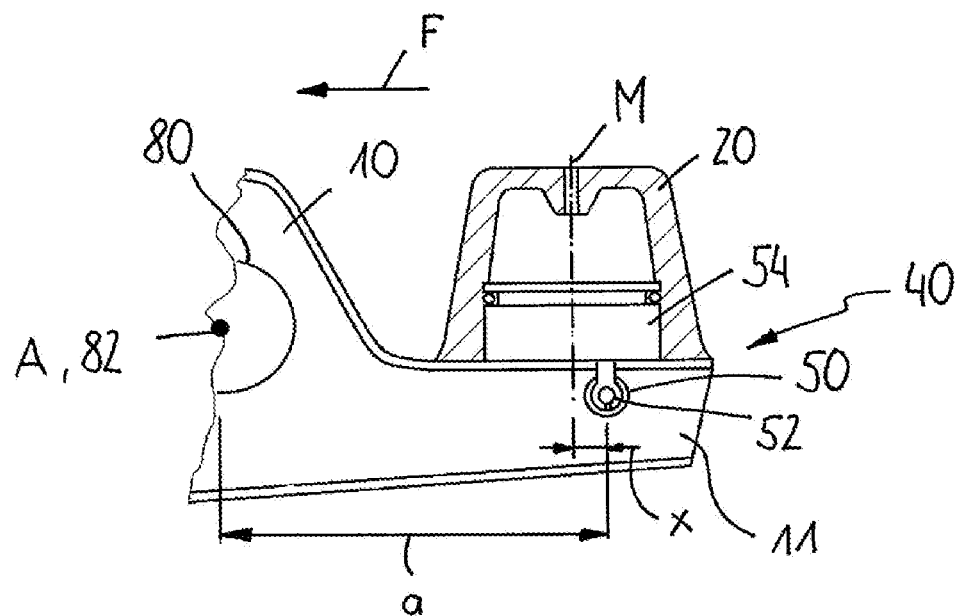
FIG. 1 shows a side view of one preferred embodiment of a chassis system in a first position.

FIG. 1 shows a side view of a chassis system, comprising a trailing arm 10 and a plunger piston 20 which is arranged at an arm end 11 of the trailing arm 10 in a connecting region 40. The trailing arm 10 which extends substantially along a driving direction which is indicated by the designation F has an arrangement region for an axle tube 80 which extends along an axle tube longitudinal direction A, the designation 82 denoting an axle tube center point. A spacing a from a guide element 50 which is configured in the embodiment which is shown here as a substantially round guide channel 50 is measured relative to said axle tube center point. An engagement element 52 is arranged in said guide channel, a translational displacement of the plunger piston 20 relative to the trailing arm 10 being made possible, as it were, transversely with respect to a plane of the drawing. The plunger piston 20 has a center axis M which represents, as it were, a rotational axis of the plunger piston 20. The guide element 50 and the engagement element 52 are positioned at a spacing x which lies in a range of approximately from 18 to 26 mm. The spacing a is approximately from 360 to 364 mm. In the embodiment which is shown here, the engagement element 52 is configured as a part of an insert 54, the insert 54 being rotatable relative to the plunger piston 20. In other words, the plunger piston 20 is therefore of rotatable configuration with respect to the adjusting device.

Figure 2:
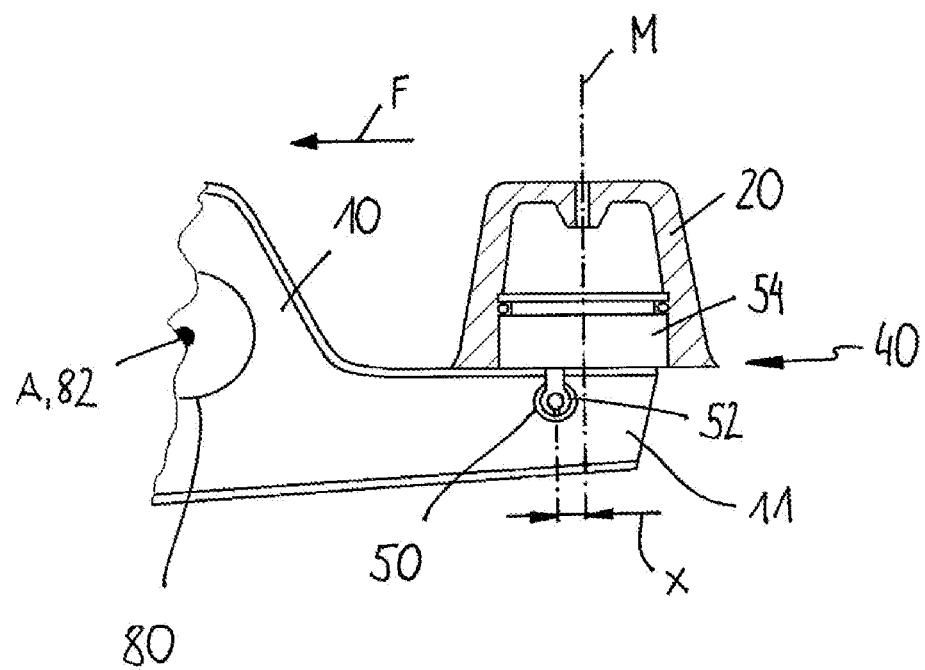
FIG. 2 shows a further view of that embodiment of a chassis system which is known from FIG. 1, in a second position.

FIG. 2 shows that embodiment of a chassis system which is known from FIG. 1. The main focus is directed at the fact that the plunger piston 20 or its center axis M is arranged here behind the adjusting device, comprising the guide element 50 and the engagement element 52, in relation to the driving direction F. By way of the configuration of the adjusting device, not only a displacement of the plunger piston 20 relative to the trailing arm 10 along the guide channel 50 is therefore realized, but rather also transversely with respect thereto.

LIST OF DESIGNATIONS

10 Trailing arm
11 Arm end
20 Plunger piston
40 Connecting region
50 Guide element, guide channel, groove profile
52 Engagement element
54 Insert
80 Axle tube
82 Axle tube center point
A Axle tube longitudinal direction
M Center axis
x Spacing
a Spacing
F Driving direction

The invention claimed is:

1. A chassis system for commercial vehicles, comprising:
a trailing arm;
a plunger piston; and
a connecting region connecting the trailing arm and the plunger piston, the connecting region having an adjusting device which comprises a guide element and an engagement element moveable relative to the guide element thereby allowing a translational movement of the plunger piston relative to the trailing arm, the engagement element displaceable in the guide element in an infinitely variable manner.

2. The chassis system as claimed in claim 1, where the adjusting device is configured such that the translational movement is substantially parallel to an axle tube longitudinal direction.

3. The chassis system as claimed in claim 1, wherein the guide element has a guide channel.

4. The chassis system as claimed in claim 3, wherein the guide channel has a groove profile.

5. The chassis system as claimed in claim 3, wherein the guide channel is closed at one end.

6. The chassis system as claimed in claim 1, wherein one or more spacer pieces are arranged in or on the guide element and configured to allow setting of a position of the engagement element relative to the trailing arm and/or to the guide element.

7. The chassis system as claimed in claim 1, wherein the guide element is spaced apart from an axle tube center point at a spacing of from about 340 to about 380 mm.

8. The chassis system as claimed in claim 1, wherein the engagement element is offset relative to a center axis of the plunger piston by a spacing.

9. The chassis system as claimed in claim 1, wherein the engagement element is configured such that the plunger piston is rotatable relative to the trailing arm.

10. The chassis system as claimed in claim 1, wherein the engagement element is mounted rotatably in and/or on the plunger piston.

11. The chassis system as claimed in claim 1, wherein the engagement element is rotatably mounted to the plunger piston via an insert rotatably arranged in the plunger piston.

\* \* \* \* \*